(12) United States Patent
Tatebayashi et al.

(10) Patent No.: US 7,807,283 B2
(45) Date of Patent: *Oct. 5, 2010

(54) NONAQUEOUS ELECTROLYTE SECONDARY BATTERY

(75) Inventors: Yoshinao Tatebayashi, Yokohama (JP); Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/342,195

(22) Filed: Dec. 23, 2008

(65) Prior Publication Data

US 2009/0130543 A1 May 21, 2009

Related U.S. Application Data

(62) Division of application No. 11/087,596, filed on Mar. 24, 2005, now Pat. No. 7,482,090.

(30) Foreign Application Priority Data

Mar. 29, 2004 (JP) .............................. 2004-094984

(51) Int. Cl.
*H01M 10/50* (2006.01)
(52) U.S. Cl. .......................................... 429/60; 429/62
(58) Field of Classification Search ....................... None
See application file for complete search history.

(56) References Cited

U.S. PATENT DOCUMENTS

| | | | |
|---|---|---|---|
| 5,188,909 A * | 2/1993 | Pedicini | 429/7 |
| 7,482,090 B2 * | 1/2009 | Tatebayashi et al. | 429/60 |
| 2003/0138696 A1 * | 7/2003 | Peres et al. | 429/231.1 |
| 2006/0068272 A1 | 3/2006 | Takami et al. | |
| 2006/0134520 A1 | 6/2006 | Ishii et al. | |
| 2007/0009797 A1 | 1/2007 | Takami et al. | |
| 2007/0059592 A1 | 3/2007 | Takami et al. | |
| 2007/0059602 A1 | 3/2007 | Morishima et al. | |
| 2007/0072080 A1 | 3/2007 | Inagaki et al. | |
| 2007/0231690 A1 | 10/2007 | Fujita et al. | |
| 2007/0231693 A1 | 10/2007 | Inagaki et al. | |
| 2007/0231702 A1 | 10/2007 | Fujita et al. | |
| 2007/0281214 A1 | 12/2007 | Saruwatari et al. | |
| 2008/0070115 A1 | 3/2008 | Saruwatari et al. | |
| 2008/0176142 A1 | 7/2008 | Inagaki et al. | |
| 2008/0241687 A1 | 10/2008 | Ishii et al. | |

FOREIGN PATENT DOCUMENTS

| JP | 59-195670 | 12/1984 |
|---|---|---|
| JP | 6-163052 | 6/1994 |
| JP | 11-54007 | 2/1999 |

\* cited by examiner

*Primary Examiner*—Patrick Ryan
*Assistant Examiner*—Alix Echelmeyer
(74) *Attorney, Agent, or Firm*—Oblon, Spivak, McClelland, Maier & Neustadt, L.L.P.

(57) ABSTRACT

A nonaqueous electrolyte secondary battery includes a negative electrode including a negative electrode current collector and a negative electrode active material layer that is formed on a first region of the negative electrode current collector, a negative electrode terminal connected to an edge section of a second region of the negative electrode current collector, a positive electrode including a positive electrode active material layer positioned to face the negative electrode active material layer and the second region, and a stress imparting member which imparts a tensile stress or a shearing stress to the second region.

11 Claims, 5 Drawing Sheets

NONAQUEOUS ELECTROLYTE SECONDARY BATTERY

CROSS-REFERENCE TO RELATED APPLICATIONS

This application is a divisional of and claims the benefit of priority under 35 U.S.C. §120 from U.S. application Ser. No. 11/087,596, filed Mar. 24, 2005, and claims the benefit of priority under 35 U.S.C. §119 of Japanese Patent Application No. 2004-094984, filed Mar. 29, 2004, the entire contents of which are incorporated herein by reference.

BACKGROUND OF THE INVENTION

1. Field of the Invention

The present invention relates to a nonaqueous electrolyte secondary battery.

2. Description of the Related Art

Much research is being carried out on a nonaqueous electrolyte secondary battery that is charged and discharged by the migration of lithium ions between the positive electrode and the negative electrode in an attempt to develop a battery having a high energy density.

In general, the nonaqueous electrolyte secondary battery, if over-charged, is accompanied by dangers such as temperature elevation, liquid leakage, gas release, and ignition. Therefore, a safety mechanism for decreasing or stopping the current is mounted to the nonaqueous electrolyte secondary battery.

The safety mechanism against over-charging is classified into an outer element and an inner element.

The outer element includes in general a PTC (Positive Temperature Coefficient) thermistor and a temperature fuse, which are of the temperature-dependent type. However, the outer element, which is detachable, lacks safety and gives rise to, for example, cost elevation and, thus, the outer element is not desirable. Also, the element of the temperature-dependent type was defective in that the operation thereof tended to be nonuniform.

Such being the situation, various inner elements of the pressure-dependent type, the expansion-dependent type, etc. have been proposed. However, in the case of employing the pressure-dependent type inner element, which is operated by the elevation of the internal pressure, it is impossible to use a flexible case made of a flexible material such as a laminate film. On the other hand, the expansion-dependent type inner element, which is operated by the expansion in the inner volume of the nonaqueous electrolyte secondary battery, makes it possible to use a flexible case. However, the operation of the expansion-dependent type inner element is made nonuniform by the size of the free space around the nonaqueous electrolyte secondary battery. It should be noted in particular that, where the free space around the nonaqueous electrolyte secondary battery is extremely small, the inner element is unlikely to be expanded, with the result that the safety of the nonaqueous electrolyte secondary battery is impaired.

On the other hand, Japanese Patent Disclosure (Kokai) No. 6-163052 discloses an alloying-dependent type inner element as a safety mechanism for the case where the nonaqueous electrolyte secondary battery is put under the reverse discharge state because the negative electrode potential is made nobler than the positive electrode potential after the over-discharge state. The inner element disclosed in this patent document comprises a positive electrode terminal formed of a metal that reacts with, for example, lithium ions under the reverse charging state so as to form an alloy, and a tensile stress imparting means for imparting a tensile stress to the positive electrode terminal. According to the inner element disclosed in this patent document, the positive electrode terminal is alloyed under the reverse charging state so as to be made brittle, with the result that the positive electrode terminal can be cut away by the tensile stress imparted by the stress imparting means. As a result, the current path is cut-off. It follows that the inner element disclosed in the patent document quoted above makes it possible to suppress the nonuniformity in the operation of the safety mechanism regardless of the material of the case of the battery.

However, the nonaqueous electrolyte secondary battery disclosed in the patent document quoted above gives rise to the problem that, if the cross sectional area of the positive electrode terminal is increased in an attempt to improve the high rate characteristics of the battery, the positive electrode terminal is rendered unlikely to be alloyed so as to impair the safety of the battery. Also, if the cross sectional area of the positive electrode terminal is decreased in an attempt to promote the alloying of the positive electrode terminal, an additional problem is generated that the high rate characteristics of the nonaqueous electrolyte secondary battery are lowered.

BRIEF SUMMARY OF THE INVENTION

An object of the present invention is to provide a nonaqueous electrolyte secondary battery having a high safety.

According to a first aspect of the present invention, there is provided a nonaqueous electrolyte secondary battery, comprising:

a case;

a negative electrode provided in the case and including a negative electrode current collector formed of aluminum or an aluminum alloy, and a negative electrode active material layer that is formed on a first region of the negative electrode current collector and has a Li absorption-release potential nobler by at least 0.4V than a lithium electrode potential;

a negative electrode terminal connected to an edge section of a second region of the negative electrode current collector, the negative electrode active material layer is not formed in the second region;

a positive electrode including a positive electrode active material layer that absorbs and releases Li element or Li ions and is positioned to face the negative electrode active material layer and the second region of the negative electrode current collector;

a separator provided between the positive electrode and the negative electrode;

a stress imparting member which imparts a tensile stress or a shearing stress to the second region of the negative electrode current collector; and a nonaqueous electrolyte provided in the case.

According to a second aspect of the present invention, there is provided a nonaqueous electrolyte secondary battery, comprising:

a positive electrode including a positive electrode active material layer absorbing-releasing Li element or Li ions;

a negative electrode including a negative electrode current collector formed of aluminum or an aluminum alloy and a negative electrode active material layer formed on a first region of the negative electrode current collector, and the negative electrode active material layer containing a negative electrode active material having a Li absorption-release potential nobler by at least 0.4V than a lithium electrode potential;

a negative electrode terminal electrically connected to a part of a second region of the negative electrode current collector, the negative electrode active material layer is not formed in the second region;

a separator provided between the positive electrode and the negative electrode;

a current stopping section formed in another part of the second region of the negative electrode current collector, the current stopping section being positioned between the negative electrode terminal and the negative electrode active material layer and facing the positive electrode active material layer via the separator; and a current stopping mechanism which imparts a tensile stress or a shearing stress to the current stopping section.

According to a third aspect of the present invention, there is provided a nonaqueous electrolyte secondary battery comprising an electrode group prepared by spirally winding a laminate structure including a positive electrode, a negative electrode and a separator; a negative electrode terminal; a current stopping section; and a current stopping mechanism, wherein:

the positive electrode includes a positive electrode active material layer absorbing-releasing Li element or Li ions;

the negative electrode includes a negative electrode current collector and a negative electrode active material layer, the negative electrode current collector being formed of aluminum or an aluminum alloy and having a first region and a second region, the negative electrode active material layer being formed on the first region of the negative electrode current collector, and the negative electrode active material layer containing a negative electrode active material having a Li absorption-release potential nobler by at least 0.4V than a lithium electrode potential;

the negative electrode terminal is electrically connected to an outer edge section of the second region of the negative electrode current collector;

the current stopping section is formed in the second region of the negative electrode current collector and positioned between the negative electrode terminal and the negative electrode active material layer, and the current stopping section facing the positive electrode active material layer via the separator; and the current stopping mechanism comprises a thermally shrinkable resin tape fixed to the current stopping section.

According to a fourth aspect of the present invention, there is provided a nonaqueous electrolyte secondary battery comprising a case; an electrode group provided in the case and formed of a laminate structure including a positive electrode, a negative electrode and a separator; a negative electrode terminal; a current stopping section; and a current stopping mechanism, wherein:

the positive electrode includes a positive electrode active material layer absorbing-releasing Li element or Li ions;

the negative electrode includes a negative electrode current collector and a negative electrode active material layer, the negative electrode current collector being formed of aluminum or an aluminum alloy and having a projecting portion, the negative electrode active material layer being formed on the negative electrode current collector excluding at least the projecting portion and containing a negative electrode active material having a Li absorption-release potential nobler by at least 0.4V than a lithium electrode potential, and the projecting portion has a first section that faces the positive electrode active material layer via the separator, and a second section;

the negative electrode terminal is electrically connected to the second section of the projecting portion of the negative electrode current collector;

the current stopping section is formed in the first section of the projecting portion of the negative electrode current collector, the current stopping section lying in a current path between the negative electrode terminal and the negative electrode current collector; and a current stopping mechanism comprises a spring member that is arranged in a compressed state between the inner surface of the case and the projecting portion of the negative electrode current collector.

Further, according to a fifth aspect of the present invention, there is provided a nonaqueous electrolyte secondary battery comprising a case; an electrode group provided in the case and formed of a laminate structure including a positive electrode, a negative electrode and a separator; a negative electrode terminal; a current stopping section; and a current stopping mechanism, wherein:

the positive electrode includes a positive electrode active material layer absorbing-releasing Li element or Li ions;

the negative electrode includes a negative electrode current collector and a negative electrode active material layer, the negative electrode current collector being formed of aluminum or an aluminum alloy and having a projecting portion, the negative electrode active material layer being formed on the negative electrode current collector excluding at least the projecting portion and containing a negative electrode active material having a Li absorption-release potential nobler by at least 0.4V than a lithium electrode potential, and the projecting portion has a first section that faces the positive electrode active material layer via the separator, and a second section;

the negative electrode terminal is electrically connected to the second section of the projecting portion of the negative electrode current collector;

the current stopping section is formed in the first section of the projecting portion of the negative electrode current collector, the current stopping section lying in a current path between the negative electrode terminal and the negative electrode current collector; and the current stopping mechanism has a shape memory alloy member which is provided between an inner surface of the case and the projecting portion and which applies pressure to the projecting portion when a temperature in the case rises.

DETAILED DESCRIPTION OF THE INVENTION

Figure 1:
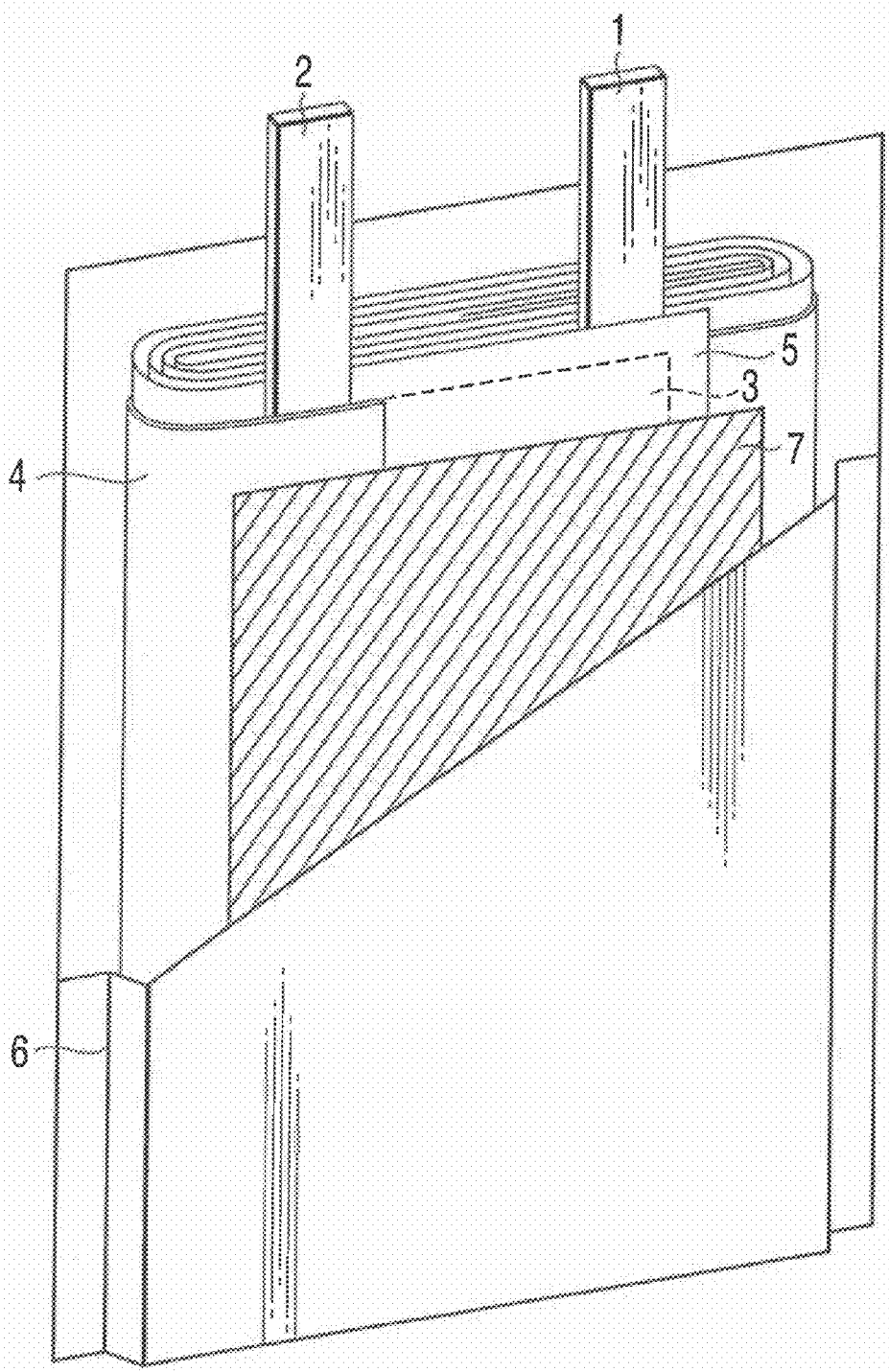
FIG. 1 is an oblique view, partially broken away, schematically showing the construction of a wound type nonaqueous electrolyte secondary battery according to a first embodiment of the present invention.

Some embodiments of the present invention will now be described with reference to the accompanying drawings. Incidentally, the same reference numerals apply to the common constituents of the battery throughout all the embodiments of the present invention so as to avoid an overlapping description. Also, the accompanying drawings are schematic drawings that are intended to facilitate the description and understanding of the invention. It is possible for the shape, size, ratio, etc. shown in the drawings to differ from those of the actual nonaqueous electrolyte secondary battery. Of course, it is possible to change appropriately the design of the battery in view of the description given below and the present level of technology.

As a result of extensive research, the present inventors have arrived at a prominent technical idea as pointed out below.

Specifically, the negative electrode includes a negative electrode current collector formed of aluminum or an aluminum alloy and a negative electrode active material supported by a first region of the current collector. The active material of the negative electrode allows the operating potential of the negative electrode to be nobler by at least about 0.4V than the potential of the lithium metal. The negative electrode active material is not supported intentionally by a part of the current collector of the negative electrode, i.e., a second region of the negative electrode current collector. The second region of the negative electrode current collector does not support the active material. A part of the second region faces the positive electrode via a separator. In other words, prepared is a nonaqueous electrolyte secondary battery including a region A formed of a laminate structure consisting of the negative electrode current collector, the separator, the positive electrode active material layer, and the positive electrode current collector. The region A in which the negative electrode current collector does not support the active material is formed so as to cut-off the current path of the negative electrode current collector when the region A is alloyed.

In this case, the negative electrode current collector exhibits a satisfactory electrical conductivity during the ordinary use of the nonaqueous electrolyte secondary battery. Also, when the battery is put under an over-charged state so as to make the potential of the negative electrode baser by about 0.3V than the potential of the lithium metal, aluminum in the portion corresponding to region A of the negative electrode current collector reacts with the lithium ions supplied from the positive electrode active material so as to form an Al—Li alloy having a high resistivity, with the result that the current flowing through the negative electrode current collector is drastically decreased.

According to the technology described above, a nonaqueous electrolyte secondary battery having a high safety can be obtained without sacrificing the high rate characteristics.

However, even if the negative electrode current collector in the region A is converted into an Al—Li alloy, it is difficult to cut-off the current path. Also, it is possible for the negative electrode current collector in the region A not to be converted promptly into the Al—Li alloy. In this case, the temperature of the nonaqueous electrolyte secondary battery is elevated by a weak current, leading possibly to the breakage or rupture of the battery. Such being the situation, in order to more improve the safety, it is desirable for the nonaqueous electrolyte secondary battery to include a current stopping mechanism that permits physically interrupting the current path. The current stopping mechanism of this type includes, for example, a stress imparting member for imparting a tensile stress or a shearing stress to the region A of the negative electrode current collector.

The nonaqueous electrolyte secondary battery according to the present invention comprises the negative electrode including a negative electrode current collector. A negative electrode active material layer is formed in a large first region on the surface of the negative electrode current collector. Under the over-charged state of the nonaqueous electrolyte secondary battery, a region A of the negative electrode current collector, i.e., a second region of the negative electrode current collector, is allowed to react with lithium supplied from the positive electrode active material so as to form an Al—Li alloy of a high resistivity so as to decrease the charging current. The negative electrode active material layer is not formed in the second region of the negative electrode current collector. The second region is positioned to face the positive electrode active material layer via the separator. Further, since the Al—Li alloy thus formed is brittle, the alloy is easily broken if the alloy is displaced even if slightly by a stress applied in the direction of breaking the negative electrode current collector, i.e., if the alloy is displaced by a tensile stress or a shearing stress applied to the region A. It follows that, in the nonaqueous electrolyte secondary battery, the charging current can be stopped easily.

Also, according to the present invention, the negative electrode current collector in the region A is not converted into the Al—Li alloy until the over-charged state. It follows that the nonaqueous electrolyte secondary battery is capable of maintaining the high rate characteristics until the over-charging.

Further, according to the present invention, it is desirable for the region A of the negative electrode current collector to be formed in a manner to extend across the current path of the negative electrode current collector. In this case, the current path of the negative electrode current collector can be broken more easily.

The present invention will now be described more in detail in respect of the stress imparting member for imparting a tensile stress or a shearing stress, the negative electrode, the positive electrode, the separator, the nonaqueous electrolyte, and the case.

1) Stress Imparting Member for Imparting Tensile Stress or Shearing Stress:

The stress imparting member for imparting a tensile stress or a shearing stress includes a continuous loading type member and a condition response type member. These types of stress imparting members can be selected appropriately in view of the use of the nonaqueous electrolyte secondary battery, the shape of the electrode group, the mechanical strength of the negative electrode current collector, etc.

The continuous loading type stress imparting member that continuously imparts a tensile stress or a shearing stress will be described first.

The operating timing of the continuous loading type stress imparting member is determined by the brittleness of the Al—Li alloy, i.e., by the over-charged amount of electricity. Therefore, the continuous loading type is advantageous over the condition response type in that an inconvenience of the operation is not generated by the external environmental factors such as temperature and the space.

The stress imparted to the region A should be large enough to break the region A formed of the Al—Li alloy, but should not be so large as to break the negative electrode current collector formed of an aluminum foil or an aluminum alloy foil. To be more specific, it is desirable for a tensile stress or a shearing stress imparted to the region A to fall within a range of 0.2 N/mm$^2$ to 50 N/mm$^2$, though the stress that should be imparted to the region A differs depending on the shape and area of the region A and the thickness, width, and the number of layers of the negative electrode current collector that are laminated one upon the other. It is more desirable for the stress imparted to the region A to fall within a range of 1 N/mm$^2$ and 10 N/mm$^2$.

The continuous loading type stress imparting member includes, for example, a spring. The spring used as the stress imparting member will now be described.

Springs made of various metals can be used as the stress imparting member. It is desirable for the surface of the spring to be electrically insulated. When the spring is electrically connected to, for example, the negative electrode current collector, it is possible for the metal forming the spring to be eluted so as to impair the Li absorbing-releasing reaction. It is also possible for the metal forming the spring to be alloyed with lithium under the over-charged state of the secondary battery, with the result that the spring is made brittle so as to cause the mechanical strength of the spring to be made insufficient.

Concerning the shape of the spring, the spring as the stress imparting member includes, for example, a leaf spring, a coil spring, an angular spring, and a telescopic spring.

It is desirable for the thickness of the spring to fall within a range of 0.2 mm to 0.5 mm. If the thickness of the spring is smaller than 0.2 mm, the stress imparted to the non-forming region, i.e., that region of the negative electrode current collector in which the negative electrode active material layer is not formed, is weakened so as to make it difficult to break the non-forming region of the negative electrode current collector under the over-charged state. On the other, if the thickness of the spring exceeds 0.5 mm, it is possible for the non-forming region to be broken during the ordinary operation of the battery.

The condition response type stress imparting member, i.e., the stress imparting member imparting a tensile stress or a shearing stress when a prescribed condition is satisfied, will now be described.

The stress response type member does not impart a stress during storage and ordinary use of the battery and, thus, is advantageous over the continuous loading type member in the resistance to, for example, physical impact.

The stress imparted to the region A should be large enough to break the region A formed of the Al—Li alloy, but should not be so large as to break the negative electrode current collector formed of an aluminum foil or an aluminum alloy foil. The upper limit of the stress imparted to the region A is specified because the temperature response type current stopping mechanism gives rise to the problem that the operation of the mechanism is made nonuniform as described above. To be more specific, the upper limit of the stress noted above is equal to that in the case of the continuous loading type stress imparting member described above.

The operation of the current stopping mechanism is dependent in general on temperature. Specifically, it is desirable for the current stopping mechanism to be operable under the temperatures of 60° C. to 140° C., preferably 90° C. to 110° C. If the current stopping mechanism is operable under a temperature lower than 60° C., the current stopping mechanism tends to be operated even when a dangerous situation is not expected to be brought about by the over-charged state. Also, if the current stopping mechanism is operable under a temperature higher than 140° C., a thermal runaway reaction tends to be brought about before operation of the current stopping mechanism under the over-charged state of the secondary battery.

The condition response type stress imparting member includes, for example, a thermally shrinkable resin tape and a spring-shaped member formed of a shape memory alloy.

The thermally shrinkable resin tape will now be described.

The thermally shrinkable resin tape that is shrunk under the temperatures given above is formed of the material selected from the group consisting of polyethylene, polypropylene, polyvinyl chloride, polyethylene terephthalate, ethylene-propylene rubber, isoprene rubber, chloroprene rubber, styrene-butadiene rubber, and nitrile-butadiene rubber. For forming the thermally shrinkable resin tape, it is possible to use a single kind of material or a mixture of a plurality of different kinds of materials exemplified above.

The thermally shrinkable resin tape should be in the shape of, for example, a band-like film, an oblong film or a tubular film.

As described herein later, the thermally shrinkable resin tape is fixed by using an adhesive. It is desirable for the fixed area of the thermally shrinkable resin tape to be 20 to 80%, preferably 40 to 60%, based on the entire area of the resin tape. If the fixed area of the resin tape is not smaller than 20%, the adhesive is sufficiently capable of withstanding the tensile stress given from the thermally shrinkable resin tape. Also, if the fixed area of the resin tape is not larger than 80%, the sliding resistance can be decreased in the fixed portion of the thermally shrinkable resin tape so as to increase the tensile stress imparted to the region A. Incidentally, in view of the manufacturing process, it is desirable for the adhesive to be supported in advance on the thermally shrinkable resin tape.

In view of, for example, the resistance to the nonaqueous electrolyte and the shrinking temperature, it is particularly desirable to use a porous polyethylene or a porous polypropylene for forming the thermally shrinkable resin tape.

It is desirable for the thermally shrinkable resin tape to have a thickness of 50 to 300 μm.

The spring-shaped member formed of a shape memory alloy will now be described.

It is desirable for the surface of the spring-shaped member formed of a shape memory alloy to be electrically insulated like the surface of the spring. The shape memory alloy which has a transformation temperature of 60° C. to 140° C., includes, for example, a Ti—Ni alloy, a Cu—Al—Ni alloy, a Cu—Zn—Al alloy, a Cu—Zn—Ni alloy, a Mn—Cu alloy, and an Fe—Mn alloy. It is desirable for the surface of the shape memory alloy to be electrically insulated from the negative electrode current collector like the surface of the spring.

It is desirable for the shape memory alloy member to be deformed when the transformation temperature is reached so as to impart a sufficient stress to the current stopping section, i.e., the region in which the negative electrode active material layer is not formed. The shape memory alloy member is deformed in this fashion if the alloy member is shaped like, for example, a spring.

The spring shape of the shape memory alloy member is as described previously in conjunction with the spring used as the stress imparting member.

It is desirable for the spring-shaped member formed of the shape memory alloy to adopt a plate-like shape when the transformation temperature is reached. This would allow a strong stress to be imparted to the region in which the negative electrode active material layer is not formed so as to break without fail the particular region noted above.

The stress imparting member for imparting a tensile stress or a shearing stress is fixed appropriately by using, for example, an adhesive.

It is desirable for the adhesive to maintain its adhesivity even under the environment of the nonaqueous electrolyte or under the shrinking temperature. It is possible to use, for example, a silicone-based adhesive or an acryl-based adhesive. It is desirable to use the adhesive because the adhesive permits the stress imparting member for imparting a tensile stress or a shearing stress to be operated smoothly.

It is also possible to use as the adhesive, for example, an epoxy-based resin adhesive, a silicone-based resin adhesive, an acryl-based resin adhesive, a polyimide-based resin adhesive, a polyamideimide-based resin adhesive, and a phenolic resin-based adhesive.

2) Negative Electrode:

The negative electrode is manufactured as follows. In the first step, a slurry is prepared by dispersing a negative electrode active material, a conductive agent, and a binder in an appropriate solvent. Then, one surface or both surfaces of a negative electrode current collector are coated with the slurry thus prepared, followed by drying and pressing the negative electrode current collector coated with the slurry so as to form a negative electrode active material layer on the current collector of the negative electrode, thereby manufacturing the negative electrode.

The negative electrode active material is adapted for realizing a negative electrode potential of 0.4 to 3V based on the potential of the lithium metal, and includes, for example, a metal oxide, a metal sulfide, a metal nitride, and an alloy.

The metal oxides used as the negative electrode active material include, for example, a lithium titanium oxide such as a lithium titanate (for example, $Li_{4+x}Ti_5O_{12}$, $0 \leq x \leq 3$), a tungsten oxide such as $WO_3$, an amorphous tin oxide such as $SnB_{0.4}P_{0.6}O_{3.1}$, a tin-silicon oxide such as $SnSiO_3$, and a silicon oxide such as SiO. It is more desirable to use a lithium titanium oxide as the metal oxide forming the negative electrode active material. The lithium titanium oxide can absorb and/or release Li ions.

The metal sulfides include, for example, a titanium sulfide such as $TiS_2$, a molybdenum sulfide such as $MoS_2$, and an iron sulfide such as FeS, $FeS_2$, or $Li_xFeS_2$.

Further, the metal nitride includes, for example, a lithium-cobalt nitride such as $Li_xCo_yN$ ($0<x<4$, $0<y<0.5$).

Incidentally, the negative electrode active material that permits a negative electrode working potential to be not higher than about 0.4V based on the lithium metal potential includes, for example, a carbon material. The working potential of the negative electrode containing such a negative electrode active material is small in its difference from the potential at which the region A is alloyed (about 0.3V vs. $Li/Li^+$). Such being the situation, it is not desirable to use the negative electrode active material noted above, i.e., the carbon material, because the range of the potential under which the nonaqueous electrolyte secondary battery is operated normally is narrowed.

Also, the nonaqueous electrolyte may be decomposed in general under the potential not lower than 5V relative to the potential of the lithium metal. In manufacturing a nonaqueous electrolyte secondary battery having an approximate battery voltage of 2V, it is desirable for the upper limit of the negative electrode potential (i.e., Li absorption-release potential of the negative electrode) to be set at about 3V. Incidentally, the battery voltage is a potential difference between the positive electrode potential and the negative electrode potential. "Li absorption-release potential" means a potential at which the negative electrode absorbs or releases Li element or Li ions.

The carbon material can be used as the conductive agent. The carbon material includes, for example, acetylene black, carbon black, coke, carbon fiber, and graphite.

The binder includes, for example, polytetrafluoroethylene (PTFE), polyvinylidene fluoride (PVdF), ethylene-propylene-diene copolymer (EPDM), styrene-butadiene rubber (SBR), and carboxymethyl cellulose (CMC).

Further, an aluminum foil or an aluminum alloy foil is used as the negative electrode current collector. It is desirable for the negative electrode current collector to have a thickness of 8 to 25 µm.

Concerning the mixing ratios of the negative electrode active material, the conductive agent and the binder in the negative electrode active material layer, it is desirable for the negative electrode active material to be contained in an amount of 80% by weight to 95% by weight, for the conductive agent to be contained in an amount of 3% by weight to 20% by weight, and for the binder to be contained in an amount of 2% by weight to 7% by weight.

Where the conductive agent is contained in an amount not larger than 20% by weight, it is possible to suppress the decomposition of the nonaqueous electrolyte on the surface of the conductive agent during the storage of the nonaqueous electrolyte secondary battery under high temperatures. Also, where the binder is contained in an amount not smaller than 2% by weight, a sufficiently high electrode strength can be obtained. On the other hand, where the binder is contained in an amount not larger than 7% by weight, the ratio of the insulator in the electrode can be decreased.

3) Positive Electrode:

The positive electrode is manufactured as follows. In the first step, a slurry is prepared by dispersing a positive electrode active material, a conductive agent, and a binder in an appropriate solvent. Then, one surface or both surfaces of a positive electrode current collector are coated with the slurry thus prepared, followed by drying and pressing the positive electrode current collector coated with the slurry so as to form a positive electrode active material layer on the current collector of the positive electrode, thereby manufacturing the positive electrode.

The positive electrode active material includes, for example, an oxide and a polymer.

The oxides include, for example, manganese dioxide ($MnO_2$) containing a lithium salt, iron oxide, copper oxide, nickel oxide, an iron sulfate such as $Fe_2(SO_4)_3$, a vanadium oxide such as $V_2O_5$, lithium-manganese composite oxides such as $Li_xMn_2O_4$ and $Li_xMnO_2$, a lithium-nickel composite oxide such as $Li_xNiO_2$, a lithium-cobalt composite oxide such as $Li_xCoO_2$, a lithium-nickel-cobalt composite oxide such as $LiNi_{1-y}Co_yO_2$, a lithium-manganese-cobalt composite oxide such as $LiMn_yCo_{1-y}O_2$, a Spinel type lithium-manganese-nickel composite oxide such as $Li_xMn_{2-y}Ni_yO_4$, and lithium-phosphorus oxides having an olivine structure such as $Li_xFePO_4$, $Li_xFe_{1-y}Mn_yPO_4$ and $Li_xCoPO_4$. It is desirable for x and y in the chemical formulas exemplified above to be: $0 \leq x \leq 1$, $0 \leq y \leq 1$.

The polymers include, for example, conductive polymers such as polyaniline and polypyrrole and disulfide-based polymer materials.

The positive electrode active materials that are desirable include, for example, lithium-manganese composite oxide such as $Li_xMn_2O_4$, a lithium-nickel composite oxide such as $Li_xNiO_2$, a lithium-cobalt composite oxide such as $Li_xCoO_2$, a lithium-nickel-cobalt composite oxide such as $LiNi_{1-y}Co_yO_2$, a Spinel type lithium-manganese-nickel composite oxide such as $Li_xMn_{2-y}Ni_yO_4$, a lithium-manganese-cobalt composite oxide such as $Li_xMn_yCo_{1-y}O_2$, and a lithium iron phosphate such as $Li_xFePO_4$. These positive electrode active materials make it possible to obtain a high positive electrode voltage.

In general, the nonaqueous electrolyte may be decomposed under a potential not lower than 5V. Therefore, it is desirable for the Li absorption-release potential of the positive electrode to be not higher than 5V.

The conductive agent includes, for example, acetylene black, carbon black and graphite.

On the other hand, the binder includes, for example, polytetrafluoroethylene (PTFE), polyvinylidene fluoride (PVdF) and a fluorinated rubber.

Concerning the mixing ratios of the positive electrode active material, the conductive agent and the binder in the positive electrode active material layer, it is desirable for the positive electrode active material to be contained in an amount of 80% by weight to 95% by weight, for the conductive agent to be contained in an amount of 3% by weight to 20% by weight, and for the binder to be contained in an amount of 2% by weight to 7% by weight. Where the conductive agent is contained in an amount not smaller than 3% by weight, it is possible to improve the electronic conductivity of the positive electrode active material layer so as to suppress the contact resistance with the current collector. Also, where the conductive agent is contained in an amount not larger than 20% by weight, it is possible to suppress the decomposition of the nonaqueous electrolyte on the surface of the conductive agent during the storage of the nonaqueous electrolyte secondary battery under high temperatures. Further, where the binder is contained in an amount not smaller than 2% by weight, a sufficiently high electrode strength can be obtained. Also, where the binder is contained in an amount not larger than 7% by weight, the ratio of the insulator in the electrode can be decreased.

4) Separator:

A porous separator can be used in the present invention. To be more specific, the porous separator includes, for example, a porous film containing polyethylene, polypropylene, cellulose, or polyvinylidene fluoride (PVdF), and an unwoven fabric of a synthetic resin. Particularly, it is desirable to use a porous film made of polyethylene or polypropylene, or a mixture of polyethylene and polypropylene because the particular porous film performs the function of closing the pores in accordance with elevation of the temperature so as to break the current path. It follows that the porous film noted above makes it possible to improve the safety of the nonaqueous electrolyte secondary battery.

5) Nonaqueous Electrolyte:

The nonaqueous electrolyte includes a liquid nonaqueous electrolyte prepared by dissolving an electrolyte such as a lithium salt in an organic solvent, a gel-like nonaqueous electrolyte containing a composite material that contains the liquid nonaqueous electrolyte and a polymer material, and a solid nonaqueous electrolyte containing a composite material that contains a lithium salt and a polymer material. It is also possible to use as the nonaqueous electrolyte an ionic liquid containing lithium ion.

The liquid nonaqueous electrolyte can be prepared by dissolving an electrolyte in an organic solvent in a concentration of 0.5 to 2 mol/L.

The electrolyte includes, for example, $LiBF_4$, $LiPF_4$, $LiAsF_6$, $LiClO_4$, $LiCF_3SO_3$, $LiN(CF_3SO_2)_2$, $LiN(C_2F_5SO_2)_2$, $Li(CF_3SO_2)_3C$, and $LiB[(OCO)_2]_2$. It is possible to use a single kind of electrolyte or a mixture of a plurality of different kinds of the electrolytes exemplified above.

The organic solvent includes, for example, cyclic carbonates such as propylene carbonate (PC) and ethylene carbonate (EC), linear carbonates such as diethyl carbonate (DEC), dimethyl carbonate (DMC), and methyl ethyl carbonate (MEC), linear ethers such as dimethoxy ethane (DME) and diethoxy ethane (DEE), cyclic ethers such as tetrahydrofuran (THF) and dioxolane (DOX), as well as γ-butyrolactone (GBL), acetonitrile (AN) and sulfolane (SL). A single kind of organic solvent or a mixture of a plurality of the organic solvents exemplified above can be used.

The polymer material includes, for example, polyvinylidene fluoride (PVdF), polyacrylonitrile (PAN) and polyethylene oxide (PEO).

It should be noted that an ionic liquid which contains lithium ions, organic cations and organic anions can be in the form of a liquid under temperatures not higher than 100° C., preferably under temperatures not higher than room temperature.

6) Case:

A container made of a metal or a container made of a laminate film can be used as in the case of the nonaqueous electrolyte secondary battery. It is desirable for the case to be shaped flat, sheet, prism, or cylinder.

It is desirable for the metal case to be formed of aluminum or an aluminum alloy. In view of the weight reduction, it is desirable for the metal container to have a thickness not larger than about 0.5 mm, more preferably not larger than about 0.2 mm.

The laminate film is a multi-layered film containing, for example, an aluminum foil and a resin film covering the aluminum foil. It is possible for the resin film covering the aluminum foil to be formed of a polymer compound film made of, for example, polypropylene (PP), polyethylene (PE), nylon or polyethylene terephthalate (PET). In view of weight reduction, it is desirable for the laminate film to have a thickness not larger than about 0.2 mm.

One embodiment of a flattened nonaqueous electrolyte secondary battery comprising a wound type electrode group or a laminate type electrode group will now be described for describing more in detail the present invention.

First Embodiment

A nonaqueous electrolyte secondary battery comprising a wound type electrode group will now be described. In the nonaqueous electrolyte secondary battery described in the following, a thermally shrinkable resin tape is used for convenience as the stress imparting member for imparting a tensile stress or a shearing stress.

FIG. 1 is an oblique view, partly broken away, schematically showing the construction of a nonaqueous electrolyte secondary battery, which comprises a wound type electrode group, according to the first embodiment of the present invention. As shown in FIG. 1, the electrode group is prepared by spirally winding a laminate structure including a positive electrode 3, a negative electrode 4 and a separator 5 interposed between the positive electrode 3 and the negative electrode 4. The laminate structure noted above is spirally wound such that the negative electrode 4 is positioned to constitute the outermost layer of the laminate structure and that the wound laminate structure has a flattened shape. The electrode group is housed in a bag-like case 6 made of a film, and a nonaqueous electrolyte is held by the electrode group housed in the case 6. The outer circumferential edge portion of the electrode group (i.e., the edge portion at which the winding is finished) includes the winding edges of the separator 5, the positive electrode 3 and the negative electrode 4, which are positioned in the order mentioned as viewed in the direction perpendicular to a winding axis. A band-like positive electrode terminal 1 is electrically connected by, for example, welding to a region in the vicinity of the outer circumferential edge of the positive electrode 3. Also, a band-like negative electrode terminal 2 is electrically connected by, for example, welding to a region in the vicinity of the outer circumferential edge of the negative electrode 4. The tip portions of the positive electrode terminal 1 and the negative electrode terminal 2 are withdrawn from within the case 6 to the outside. A thermally shrinkable resin tape 7 is fixed at one edge portion to the outer circumferential edge portion of the negative electrode 4 and fixed at the edge portion on the opposite side to the negative electrode 4 on the outermost circumferential surface of the wound electrode group. As apparent from the drawing, the resin tape 7 extends in the direction perpendicular to a winding axis in a manner to bestride the outer circumferential edge portions of the positive electrode 3 and the separator 5.

Figure 4:
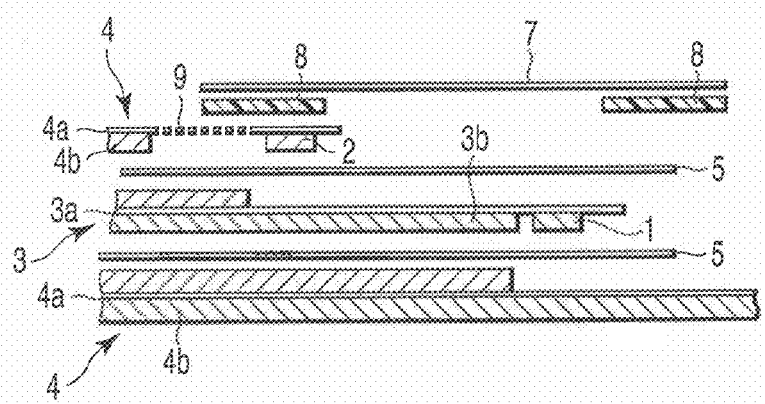
FIG. 4 is a partial cross sectional view schematically showing the construction, as viewed from the lower side, of a region in the vicinity of the outer circumferential edge portion of the wound type nonaqueous electrolyte secondary battery shown in FIG. 1 under the state before operation of a current stopping mechanism.

Incidentally, as shown in FIG. 4, the positive electrode 3 includes a positive electrode current collector 3a and a positive electrode active material layer 3b containing a positive electrode active material. The positive electrode active material layer 3b is supported on each of the both surfaces of the positive electrode current collector 3a. Likewise, the negative electrode 4 includes a negative electrode current collector 4a and a negative electrode active material layer 4b containing a negative electrode active material. The negative electrode active material layer 4b is supported on each of the both surfaces of the negative electrode current collector 4a.

Figure 2:
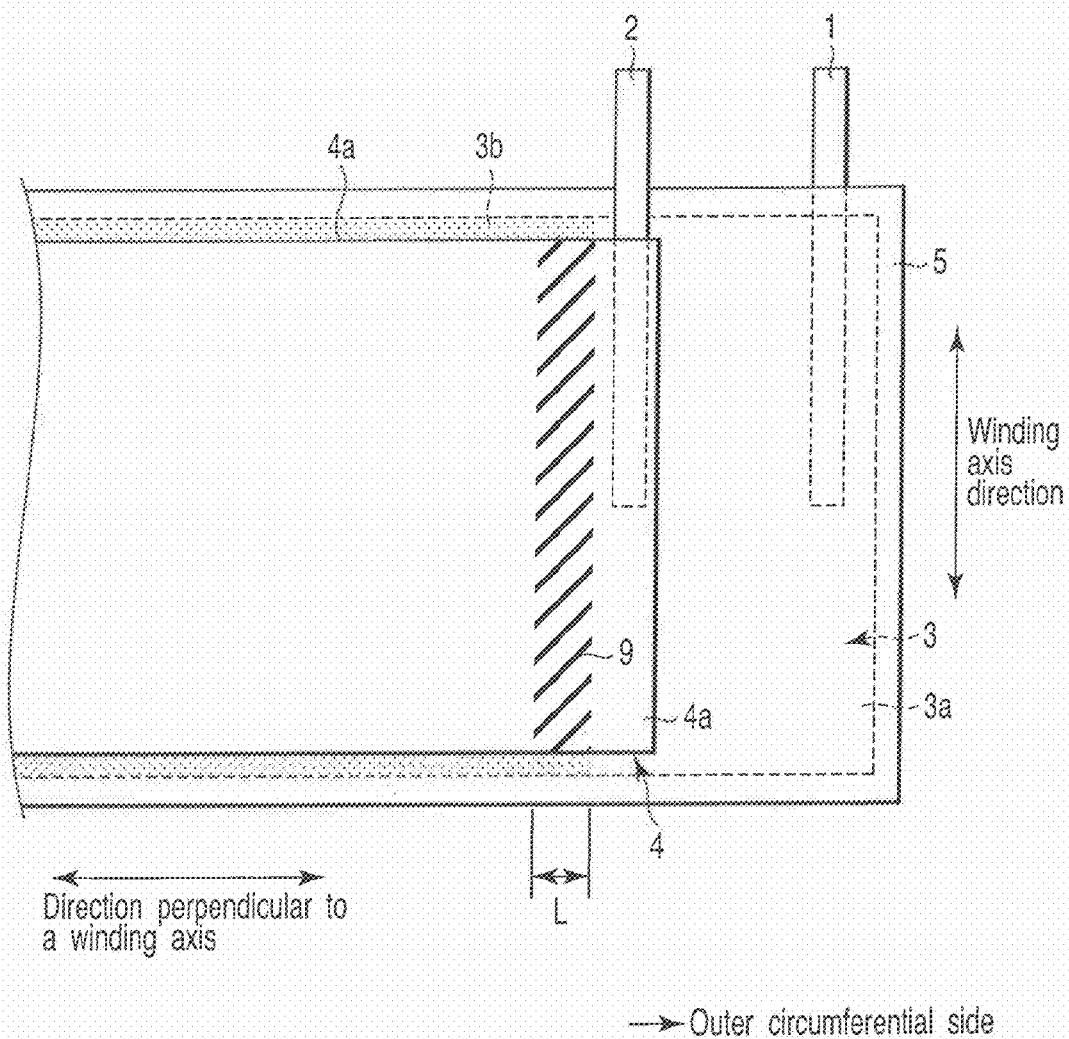
FIG. 2 is a partial plan view directed to the unfolded state of a wound type electrode group and schematically showing the construction in the outer circumferential edge portion of the electrode group.

The electrode group will now be described in detail with reference to FIG. 2. Specifically, FIG. 2 is a partial plan view showing the unfolded state of the electrode group included in the wound type nonaqueous electrolyte secondary battery shown in FIG. 1 and schematically showing the construction of the outer circumferential edge portion of the electrode group. Incidentally, the portion concealed by the upper layer is denoted by dotted lines in FIG. 2.

As shown in FIG. 2, the positive electrode current collector 3a having an area smaller than that of the separator 5 is arranged on one surface, i.e., the back surface in FIG. 2, of the separator 5. Also, the negative electrode current collector 4a having an area smaller than that of the positive electrode current collector 3a is arranged on the opposite surface (i.e., the front surface in FIG. 2) of the separator 5. The separator 5, the positive electrode 3 and the negative electrode 4 differ from each other in width in a short side direction. To be more specific, the separator 5 has the largest width, and the negative electrode has the smallest width. Naturally, the positive electrode 3 has a width intermediate between the widths of the separator 5 and the negative electrode 4.

As shown in FIG. 4, the band-like negative electrode terminal 2 is electrically connected to a second region of the negative electrode current collector 4a surface. The second region faces the separator 5. The negative electrode terminal 2 is positioned in the outer circumferential edge portion of the second region of the negative electrode current collector 4a. Also, the negative electrode active material layer 4b is formed on the current collector 4a in a manner to face the separator 5. The active material layer 4b is positioned apart from the negative electrode terminal 2. The negative electrode active material layer is not formed in the second region of the negative electrode current collector 4a. A part of the second region of the negative electrode current collector 4a is positioned between the negative electrode terminal 2 and the negative electrode active material layer 4b so as to form a non-forming portion. The non-forming portion crosses the current path between the negative electrode terminal 2 and the negative electrode current collector 4a so as to perform the function of the current stopping section 9. The positive electrode active material layer 3b is formed on that surface of the positive electrode current collector 3a which faces the separator 5. The positive electrode active material layer 3b is formed in the position corresponding to the current stopping section 9 and the negative electrode active material layer 4b. The band-like positive electrode terminal 1 is electrically connected to the outer circumferential edge portion on the opposite surface of the positive electrode current collector 3a. The positive electrode active material layer 3b is also formed on the opposite surface of the positive electrode current collector 3a. Also, the separator 5 and the negative electrode 4 are arranged in the order mentioned on the side of the inner circumferential surface of the positive electrode active material layer 3b.

Since the current stopping section 9 of the negative electrode current collector 4a is positioned to face the positive electrode active material layer 3b via the separator 5, an Al—Li alloy can be formed under the over-charged state of the secondary battery.

Also, the negative electrode 4 is positioned to constitute the outermost circumferential surface of the electrode group. It should be noted that the outermost circumferential surface of the electrode group that includes the current stopping section 9 is formed of the negative electrode current collector 4a. The outer circumferential edge section of the separator 5 is withdrawn from the outer circumferential edge section of the negative electrode 4. As a result, the outer circumferential edge section of the positive electrode 3 is prevented from being exposed to the outermost circumferential surface of the electrode group.

Figure 3:
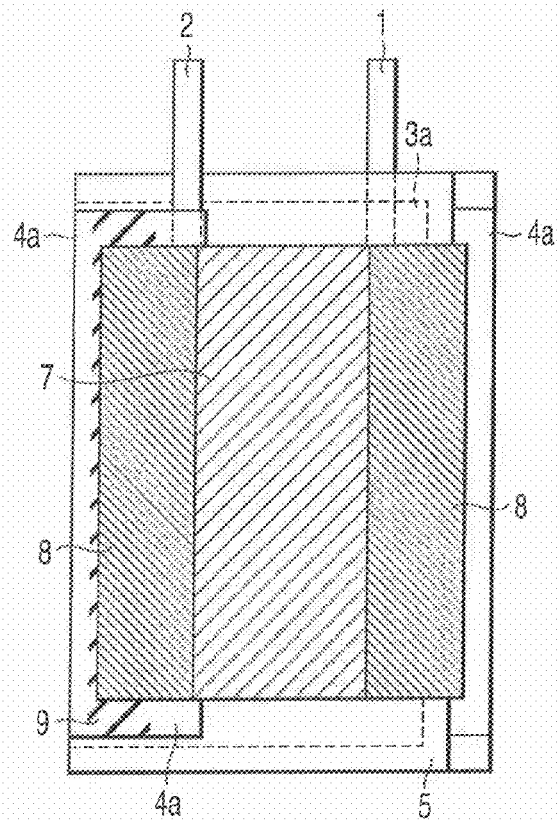
FIG. 3 is a plan view schematically showing the construction on the outer circumferential edge side of the wound type electrode group included in the wound type nonaqueous electrolyte secondary battery shown in FIG. 1.

The thermally shrinkable resin tape will now be described in detail with reference to FIG. 3. Specifically, FIG. 3 is a plan view schematically showing the construction on the side of the outer circumferential edge of the wound electrode group included in the wound type nonaqueous electrolyte secondary battery shown in FIG. 1. As shown in FIG. 3, the thermally shrinkable resin tape 7 is shaped oblong and sized smaller than the flattened surface (principal surface) of the electrode group. The width of the thermally shrinkable resin tape 7 in a direction perpendicular to the winding direction of the electrode group, i.e., a direction parallel to a winding axis, is smaller than the width of the negative electrode current collector 4a in a direction perpendicular to the longitudinal direction. Owing to this particular construction, the resin tape 7 is allowed to apply a sufficient stress to the current stopping section 9 when the resin tape 7 is thermally shrunk. It should be noted that an adhesive section 8 is formed in each of both edge sections of the thermally shrinkable resin tape 7, said edge section extending in a direction perpendicular to the winding direction of the electrode group. Incidentally, the region having the adhesive section 8 supported therein is shown shaded in FIG. 3. One adhesive section 8 of the thermally shrinkable resin tape 7 is fixed to the outer circumferential edge section of the negative electrode 4 and to the current stopping section 9. Also, the other adhesive section 8 is fixed to the outer circumferential edge section of the separator 5 and to the negative electrode 4 on the outermost circumferential section of the electrode group. It follows that the thermally shrinkable resin tape 7 makes it possible to fix the edge section of the electrode group in the winding direction. Also, the resin tape 7 functions as the current stopping mechanism and as the tape for preventing erroneous winding of the electrode group. Incidentally, it is desirable for the current stopping section 9 to be covered partially with the thermally shrinkable resin tape 7. If the entire region of the current stopping section 9 is covered with the resin tape 7, the current stopping section 9 is reinforced by the resin tape 7, with the result that it is possible for the current stopping section 9 not to be broken under the over-charged state of the secondary battery.

The situation before and after the operation of the current stopping mechanism will now be described in detail with reference to FIGS. 4 and 5.

FIG. 4 is a partial cross sectional view schematically showing the region, as viewed from below, in the vicinity of the outer circumferential edge portion of the wound type non-aqueous electrolyte secondary battery shown in FIG. 1 before operation of the current stopping mechanism. As shown in FIG. 4, the region noted above includes the thermally shrinkable resin tape 7, the adhesive sections 8, the negative electrode current collector 4a having the negative electrode terminal 2 welded thereto, the negative electrode active material layer 4b, the separator 5, the positive electrode active material layer 3b, the positive electrode current collector 3a having the positive electrode terminal 1 welded thereto, the positive electrode active material layer 3b, the separator 5, the negative electrode active material layer 4b, the negative electrode current collector 4a and the negative electrode active material layer 4b, which are arranged in the order mentioned as viewed from the uppermost layer. The thermally shrinkable resin tape 7 is fixed at one edge section by the adhesive section 8 to the region in the vicinity of the outer circumferential edge section of the negative electrode current collector 4a and to the region A (current stopping section 9) and is also fixed at the other edge section by the adhesive section 8 to the separator 5 and to the negative electrode current collector 4a. It should be noted that the region A (current stopping section 9) is formed of aluminum or an aluminum alloy and, thus, is ductile. Therefore, the region A is not broken before operation of the current stopping mechanism.

Figure 5:
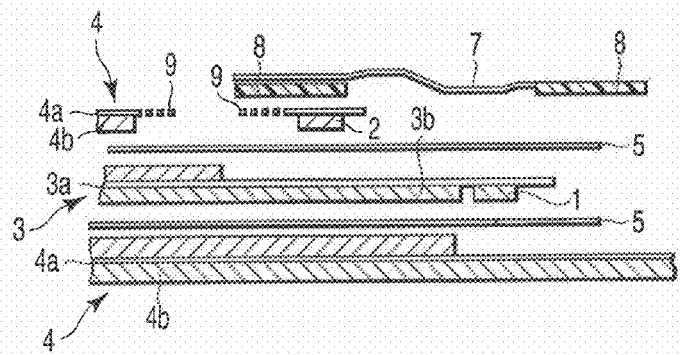
FIG. 5 is a partial cross sectional view schematically showing the construction, as viewed from the lower side, of a region in the vicinity of the outer circumferential edge portion of the wound type nonaqueous electrolyte secondary battery shown in FIG. 1 under the state after operation of a current stopping mechanism.

FIG. 5 is a partial cross sectional view schematically showing the region, as viewed from below, in the vicinity of the outer circumferential edge portion of the wound type non-aqueous electrolyte secondary battery shown in FIG. 1 after operation of the current stopping mechanism. As shown in FIG. 5, under the over-charged state of the battery, aluminum in region A (current stopping section 9) of the negative electrode 4 reacts with lithium released from the positive electrode active material layer 3b positioned to face the region A via the separator 5 so as to form an Al—Li alloy, with the result that the region A is made brittle. Also, the thermally shrinkable resin tape 7 is thermally shrunk by temperature elevation under the over-charged state of the battery. However, since both edge sections of the resin tape 7 extending in a direction perpendicular to the winding direction of the electrode group are fixed to the electrode group, a stress can be generated in the resin tape 7 in the winding direction of the electrode group. As a result, region A (current stopping section 9) is pulled by the thermally shrinkable resin tape 7 so as to cause the negative electrode current collector 4a to be broken at region A (current stopping section 9). It follows that the current path between the negative electrode current collector 4a and the negative electrode terminal 2 is broken.

It is desirable for the negative electrode 4 to be positioned to constitute the outermost circumferential surface of the electrode group. In this case, the region A (current stopping section 9) can be exposed to the outermost circumferential surface of the electrode group so as to facilitate the deformation and breakage of the region A. Also, it is desirable for the stress imparting member capable of imparting a tensile stress to be provided in that region of the negative electrode current collector 4a in which the negative electrode active material layer 4b is not formed. Particularly, it is desirable for the thermally shrinkable resin tape 7 to adhere to the region A, or a region on the outer side of the region A, of the negative electrode current collector 4a. In this case, the sliding resistance can be decreased so as to facilitate the breakage of the region A.

It is desirable for the case to be formed of a flexible material. The case formed of a flexible material tends to be expanded under the over-charged state of the battery in response to the increase in the internal pressure of the battery. It follows that the sliding resistance between the thermally shrinkable resin tape and the case can be decreased so as to increase the tensile stress imparted to the region A.

It is desirable for the width in the short side direction of the positive electrode 3 to be larger than the width in the short side direction of the negative electrode 4. Where the width in the short side direction of the positive electrode 3 is smaller than the width in the short side direction of the negative electrode 4, a part of the region A (current stopping section 9) of the negative electrode current collector 4a faces the separator 5 alone. In other words, formed is a region B consisting of a laminate structure consisting of the separator 5 and the negative electrode current collector 4a. Since the positive electrode 4 is not included in the laminate structure noted above (region B), the amount of lithium supplied to the negative electrode current collector 4a in the region B is made insufficient, with the result that the amount of the Al—Li alloy formed is made insufficient. It follows that the region B is not made brittle so as to make it difficult to break the negative electrode current collector 4a. Also, where the width in the short side direction of the positive electrode 3 is substantially equal to the width in the short side direction of the negative electrode 4, the region B is formed in the portion where a winding deviation has been generated in the winding stage of the electrode group.

It is desirable for the length of the region A (current stopping section 9) to be 2.5% to 50% of the width of the electrode group in the winding direction. If the length noted above is smaller than 2.5%, it is possible for the region A not to be positioned to face the positive electrode active material layer 3b in the case where the winding deviation is generated in the winding stage of the laminate structure consisting of the positive electrode 3, the separator 5, and the negative electrode 4. On the other hand, if the length of the region A noted above exceeds 50%, it may be difficult to obtain a high negative electrode capacity.

Second Embodiment

A nonaqueous electrolyte secondary battery comprising a laminate type electrode group will now be described. In this embodiment, the stress imparting member for imparting a tensile stress or a shearing stress is formed of a spring, for convenience.

Figure 6:
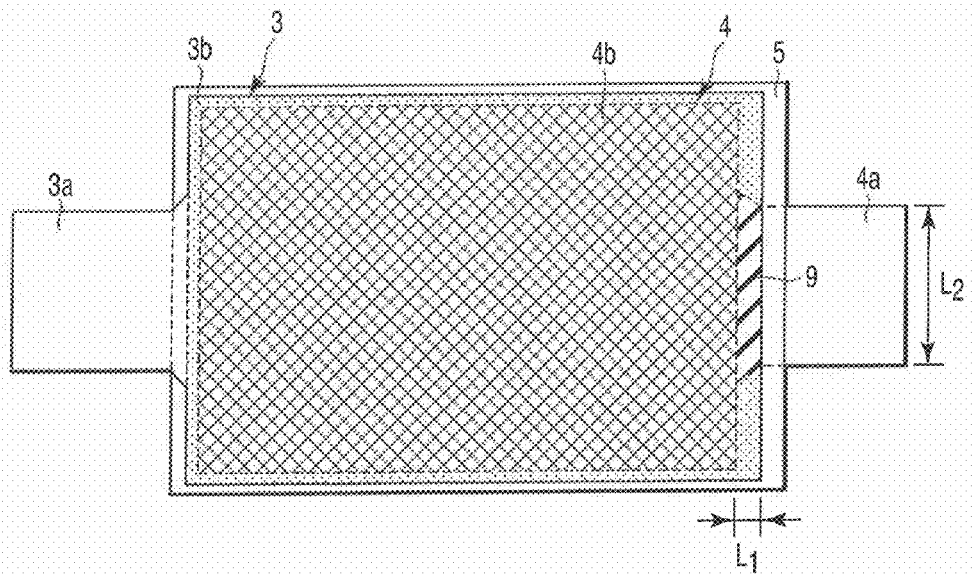
FIG. 6 is a plan view schematically showing the arrangement of the positive electrode, the negative electrode, and the separator in the electrode group included in a laminate type nonaqueous electrolyte secondary battery according to a second embodiment of the present invention.
Figure 7:
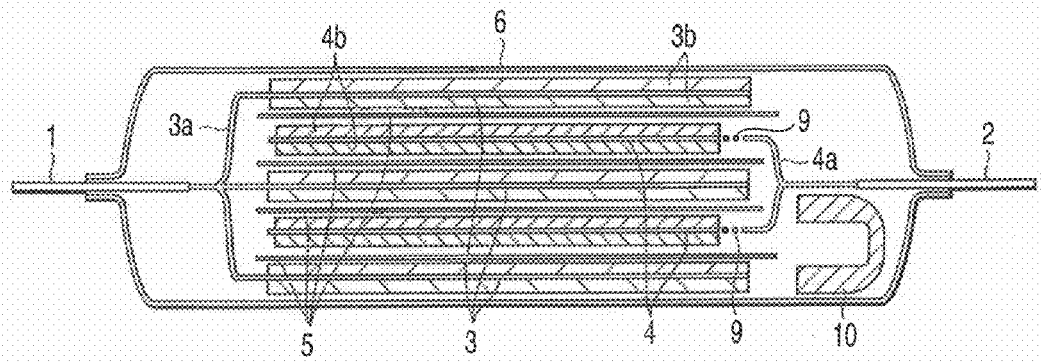
FIG. 7 is a cross sectional view schematically showing the construction of a laminate type nonaqueous electrolyte secondary battery comprising the electrode group, in which the positive and negative electrodes and the separator are arranged as shown in FIG. 6, under the state before operation of a current stopping mechanism.

FIG. 6 is a plan view schematically showing the construction of one of the electrode groups included in a laminate type nonaqueous electrolyte secondary battery according to a second embodiment of the present invention. FIG. 7 is a cross sectional view schematically showing the construction of the laminate type nonaqueous electrolyte secondary battery comprising electrode group shown in FIG. 6. Shown in this drawing is the battery under the state before operation of the current stopping mechanism. For convenience, the portion concealed by the upper layer is denoted by dotted lines. As shown in FIG. 6, the positive electrode 3 having an area smaller than that of the separator 5 is arranged on one surface (back surface in FIG. 6) of the separator 5. On the other hand, the negative electrode 4 having an area smaller than that of the positive electrode 3 is formed on the other surface (front surface in FIG. 6) of the separator 5.

The positive electrode 3 includes the positive electrode current collector 3a having a projecting portion formed on one side (left side in FIG. 6) and the positive electrode active material layer 3b formed on each of both surfaces of the positive electrode current collector 3a except the projecting portion. On the other hand, the negative electrode 4 includes the negative electrode current collector 4a having a projecting portion formed on one side (right side in FIG. 6) and the negative electrode active material layer 4b formed on each of both surfaces of the negative electrode current collector 4a except the projecting portion (the second region).

As shown in FIG. 7, a plurality of the positive electrodes 3 and a plurality of the negative electrodes 4 are laminated one upon the other with the separator 5 interposed therebetween. The positive electrode 3 is arranged to permit the projecting portion of the positive electrode current collector 3a to be positioned on the left side. The projecting portions of the plural positive electrode current collectors 3a are superposed one upon the other so as to be electrically connected to the positive electrode terminal 1. The positive electrode terminal 1 is withdrawn to the outside of the case 6 made of a film. On the other hand, the negative electrode 4 is arranged to permit the projecting portion of the negative electrode current collector 4a to be positioned on the right side. In other words, the projecting portion of the current collector 4a is positioned on the side opposite to the side on which the projecting portion of the positive electrode current collector 3a is positioned. Second sections of the projecting portions of the plural negative electrode current collectors 4a are superposed one upon the other so as to be electrically connected to the negative electrode terminal 2.

The negative electrode terminal 2 is withdrawn to the outside of the case 6 made of a film from the side opposite to the side from which the positive electrode terminal 1 is withdrawn to the outside of the case 6. The negative electrode active material layer 4b is not formed in the projecting portion of each of the negative electrode current collectors 4a. The boundary portion between the projecting portion of the negative current collector 4a and the negative electrode active material layer 4b is a first section. The first section is positioned to face the positive electrode active material layer 3b with the separator 5 interposed therebetween so as to act as the current stopping section 9. A leaf spring 10 that is folded double is arranged under a compressed state between the tip region in the superposed projecting portions of the negative electrode current collectors 4a and the inner surface of the case 6. As a result, a stress is kept applied by the leaf spring 10 to the projecting portion of the negative electrode current collector 4a. Incidentally, an insulating film (not shown) is arranged between the leaf spring 10 and the superposed projecting portions of the negative electrode current collectors 4a.

The operation of the current stopping mechanism will now be described in detail with reference to FIG. 8.

Figure 8:
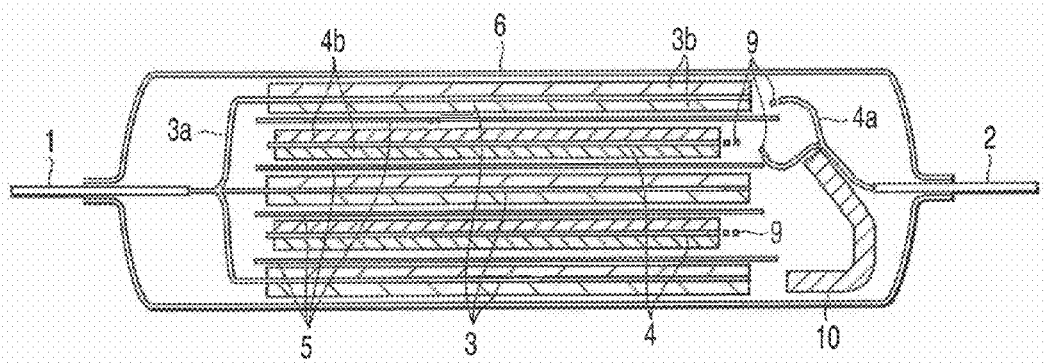
FIG. 8 is a cross sectional view schematically showing the construction of a laminate type nonaqueous electrolyte secondary battery comprising the electrode group, in which the positive and negative electrodes and the separator are arranged as shown in FIG. 6, under the state after operation of a current stopping mechanism.

FIG. 8 is a cross sectional view schematically showing the construction of a laminate type nonaqueous electrolyte secondary battery comprising the electrode group shown in FIG. 6. Shown in the drawing is the battery under the state after operation of the current stopping mechanism. Under the overcharged state of the battery, aluminum in the current stopping section 9 of the negative electrode 4 reacts with lithium released from the positive electrode active material layer 3b. The positive electrode active material layer 3b is positioned to face the current stopping section 9 with the separator 5 interposed therebetween. As a result, the Al—Li alloy is formed so as to make the current stopping section 9 (region A) brittle. It follows that the current stopping section 9 (region A) can be broken by the shearing stress imparted by the leaf spring 10 to the projecting portion of the negative electrode current collector 4a. Such being the situation, the current path between the negative electrode current collector 4a and the negative electrode terminal 2 can be broken.

As described above, in the second embodiment of the present invention, the stress imparting member for imparting a tensile stress or a shearing stress is arranged in a region in the vicinity of the superposed projecting portions of the negative electrode current collectors in which the negative electrode active material layer is not formed. It follows that a plurality of negative electrode current collectors can be broken easily collectively.

It is desirable for the width of the region A (current stopping section 9) in the projecting portion of the negative electrode current collector 4a to be set at 1% to 10% of the width in the longitudinal direction of the negative electrode current collector 4a. It is also desirable for the height of the region A (current stopping section 9) noted above to be set at 10% to 90% of the width in the short side direction of the negative electrode current collector 4a. If the width of the region A (current stopping section 9) noted above is smaller than 1%, it is difficult to break without fail the current path under the over-charged state of the battery. Also, if the width in question exceeds 10%, the negative electrode capacity tends to be made insufficient. On the other hand, where the height of the region A (current stopping section 9) noted above is smaller than 10%, the high rate discharge characteristics tend to be lowered. Also, if the height in question exceeds 90%, the projecting portion of the negative electrode current collector may tend to form an obstacle in sealing the case 6.

In the second embodiment of the present invention described above, the leaf spring 10 is used as the stress imparting member for imparting a tensile stress or a shearing stress. Alternatively, it is also possible to use a spring-shaped member formed of a shape memory alloy in place of the leaf spring 10.

In each of the first and second embodiments of the present invention described above, the technical idea of the present invention is applied to a nonaqueous electrolyte secondary battery comprising a case formed of a film. However, it is also possible to apply the technical idea of the present invention to a nonaqueous electrolyte secondary battery comprising a metal case having a prismatic shape.

Also, in the first embodiment described above, the negative electrode is positioned to constitute the outermost circumferential layer of the electrode group. Alternatively, it is also possible for the positive electrode to be positioned to constitute the outermost circumferential layer of the electrode group.

The present invention will now be described more in detail with reference to Examples. Needless to say, the technical scope of the present invention is not limited to the following Examples.

Example 1

A slurry was prepared by dispersing lithium-cobalt oxide ($LiCoO_2$) used as a positive electrode active material, a graphite power used as a conductive agent, and polyvinylidene fluoride (PVdF) used as a binder in an n-methylpyrrolidone (NMP) used as a solvent in a weight ratio of 87:8:5. Then, an aluminum foil having a thickness of 15 μm and a purity of 99.99% was coated with the slurry thus prepared, followed by drying and, then, pressing the aluminum foil coated with slurry so as to obtain an oblong positive electrode sized at 51 mm×470 mm and having an electrode density of 3.5 g/cm³.

On the other hand, another slurry was prepared by dispersing lithium titanate ($Li_4Ti_5O_{12}$) having an average particle diameter of 0.5 μm, which was used as a negative electrode active material, a carbon powder having an average particle diameter of 0.4 μm, which was used as a conductive agent, and PVdF used as a binder in an n-methylpyrrolidone (NMP) solvent in a weight ratio of 90:7:3. Then, an aluminum foil having a thickness of 15 μm and a purity of 99.99% was coated with the slurry thus obtained, followed by drying and, then, pressing the aluminum foil coated with the slurry so as to manufacture an oblong negative electrode sized at 50 mm×490 mm and having an electrode density of 2.2 g/cm³.

In the next step, a positive electrode terminal made of aluminum was connected by an ultrasonic welding to a region in the vicinity of the outer circumferential edge of the positive electrode. Further the positive electrode was covered with a separator formed of a porous polyethylene film having a thickness of 12 μm. Also, an oblong second region sized at 50 mm×10 mm, in which a negative electrode active material layer was not formed, was formed in that region of the negative electrode which corresponded to the outer circumferential edge portion of the positive electrode active material layer. The oblong region noted above constituted the region A. The region A includes the current stopping section. The length of the region A corresponded to 18% of the width of the electrode group. A negative electrode terminal made of aluminum was connected by an ultrasonic welding to a region in the vicinity of the outer circumferential edge portion of the negative electrode current collector. The connected region noted above was positioned outside the outer circumferential edge portion of the positive electrode active material layer. Further, the negative electrode was superposed on the positive electrode covered with the separator in a manner to have the separator interposed between the positive electrode and the negative electrode so as to form a laminate structure. The laminate structure was spirally wound so as to obtain an electrode group.

Prepared was a thermally shrinkable resin tape formed of an oblong porous polyethylene film. The resin film was sized at 40 mm×20 mm and had a thickness of about 50 μm. When the resin tape was heated at 110° C. for one minute, the shrinking rate of the resin tape was found to be 10%. The thermally shrinkable resin tape had a width of 20 mm in a direction parallel to the winding direction, and an acrylic adhesive section having a width of 5 mm was fixed to each of both edge portions each extending in a direction perpendicular to the winding direction, i.e., in a direction parallel to the winding axis. One of the adhesive sections of the thermally shrinkable resin tape was fixed to the current stopping section and the outer circumferential edge portion of the negative electrode current collector, and the other adhesive section was fixed to the outermost circumferential surface of the electrode group. Naturally, the resin film positioned between the adhesive sections faces the outer circumferential edge portion of the separator.

The electrode group having the outer circumferential edge portion fixed as described above was pressed so as to be molded into a flattened shape, followed by inserting the flattened electrode group into a case formed of a laminate film including an aluminum foil and having a thickness of about 0.1 mm. A nonaqueous electrolyte was prepared by dissolving $LiBF_4$ used as a lithium salt in an organic solvent prepared by mixing EC and GBL in a volume ratio of 1:2. The lithium salt was dissolved in the organic solvent in an amount of 1.5 mol/L. The nonaqueous electrolyte thus prepared was loaded in the case, followed by applying a sealing treatment to the case so as to obtain a wound type nonaqueous electrolyte secondary battery constructed as shown in FIG. 1. The battery thus obtained was sized at 3.8 mm in thickness, 63 mm in width and 95 mm in height.

Example 2

A positive electrode and a negative electrode were manufactured as in Example 1, except that the sizes of these electrodes were changed as follows. Specifically, the active material layer of the positive electrode had a short side width of about 55 mm, and a longitudinal width of about 75 mm. Also, the projecting portion of the positive electrode current collector had a length in the short side direction of about 10 mm and a length in the longitudinal direction of about 7 mm. On the other hand, the active material layer of the negative electrode had a short side width of about 55 mm, and a longitudinal width of about 70 mm. Also, the projecting portion of the negative electrode current collector had a length in the short side direction of about 10 mm and a length in the longitudinal direction of about 9 mm.

Prepared were 11 positive electrodes of the size described above and 10 negative electrodes of the size described above. Also prepared as separators were porous polyethylene films each having a short side width of about 58 mm, a longitudinal width of about 78 mm and a thickness of about 12 μm. The positive electrodes and the negative electrodes were alternately laminated one upon the other with the separator interposed therebetween, followed by pressing the laminate structure so as to obtain an electrode group of the construction shown in FIG. 6. The projecting portion had a first section and a second section. The negative electrode active material layer was not formed in the first and second sections. The first section, i.e., the region A, had a length $L_2$ in the short side direction of about 10 mm and a length $L_1$ in the longitudinal direction of about 4 mm and was rectangular. The length $L_1$ of the region A was 5.7% of the width in the longitudinal direction of the negative electrode, and the length $L_2$ of the region A was 18% of the width in the short side direction of the negative electrode. The projecting portions of the positive electrode current collectors, in which the positive electrode active material layer was not formed, were collected and connected to the positive electrode terminal made of aluminum. Also, the second sections of the projecting portions of the negative electrode current collectors were collected and connected to the negative electrode terminal made of aluminum.

A spring member was obtained by folding in a V-shape a leaf spring made of stainless steel and sized at 0.3 mm in thickness, 10 mm in width and 15 mm in length. The spring member was arranged on one side of the collected projecting portions of the negative electrode current collectors. The collected projecting portions are positioned substantially midpoint between the negative electrode current collectors of the electrode group and the negative electrode terminal. The spring member was arranged such that a stress was applied to the negative electrode current collectors in a direction perpendicular to the surfaces of the negative electrode current collectors. The spring member was fixed to the case with an adhesive tape. Then, the electrode group was inserted into the case formed of a laminate film including an aluminum foil and having a thickness of about 0.1 mm. Incidentally, an insulating tape was attached to the contact plane between the negative electrode current collector and the leaf spring so as to prevent the spring from bearing a potential equal to the negative electrode potential.

A nonaqueous electrolyte was prepared by dissolving $LiBF_4$ used as a lithium salt in an organic solvent prepared by mixing EC and GBL in a volume ratio of 1:2. The lithium salt was dissolved in the organic solvent in an amount of 1.5 mol/L. The nonaqueous electrolyte thus prepared was loaded in the case. Then, a sealing treatment was applied to the case so as to manufacture a laminate type nonaqueous electrolyte secondary battery constructed as shown in FIG. 7 and sized at about 63 mm in height, about 95 mm in width and about 3.8 mm in thickness.

Example 3

A nonaqueous electrolyte secondary battery was manufactured as in Example 2, except that a leaf spring-shaped member made of a Ti—Ni based shape memory alloy having a transformation temperature of about 100° C. was used in place of the leaf spring. Incidentally, the leaf spring-shaped member made of the Ti—Ni based shape memory alloy was prepared by folding in a V-shape a plate material having a thickness of 0.3 mm, a width of 10 mm and a length of 15 mm.

Comparative Example 1

A nonaqueous electrolyte secondary battery was manufactured as in Example 1, except that a Teflon® tape that was not shrinkable was used in place of the thermally shrinkable resin tape.

Comparative Example 2

A nonaqueous electrolyte secondary battery was manufactured as in Example 2, except that a leaf spring was not used.

Comparative Example 3

A nonaqueous electrolyte secondary battery was manufactured as in Comparative Example 2, except that the negative electrode active material layer was sized at about 55 mm in short side width and about 75 mm in longitudinal width, and that the region A was not formed.

Ten nonaqueous electrolyte secondary batteries were manufactured in accordance with each of Examples 1 to 3 and Comparative Examples 1 to 3. Each of these 10 batteries was subjected to an over-charging test, in which the battery was charged for 3 hours under a constant voltage of 2.8V and a constant current of 0.7 A so as to full charge, followed by further charging the battery for the maximum charging time of 2 hours under a constant current of 2 A to perform an over-charging test. During the over-charging test, measured were the number of batteries that ignited, the highest temperature reached, the temperature of the battery at the time when the test was finished, and the charging current at the time when the test was finished. Table 1 shows the results. Incidentally, the highest temperature reached, the temperature at the finishing time of the test, and the charging current at the finishing time of the test were calculated from the average of the measured values for the batteries that were not ignited.

TABLE 1

|  | Electrode group | Means which imparts tensile stress or shearing stress | The number of ignited batteries | Highest temperature reached | Temperature at finishing time of test | Charging current at finishing time of test |
| --- | --- | --- | --- | --- | --- | --- |
| Example 1 | Wound type | Thermally shrinkable tape | 0 | 115° C. | 35° C. | 0 A |
| Example 2 | Laminate type | Spring | 0 | 98° C. | 35° C. | 0 A |
| Example 3 | Laminate type | Spring-shaped member formed of shape memory alloy | 0 | 110° C. | 35° C. | 0 A |
| Comparative Example 1 | Wound type | — | 1 | 135° C. | 65° C. | 0.2 A |
| Comparative Example 2 | Laminate type | — | 2 | 140° C. | 90° C. | 0.6 A |
| Comparative Example 3 | Laminate type | — | 10 | — | — | — |

As shown in Table 1, the nonaqueous electrolyte secondary battery for each of Examples 1 to 3 was capable of stopping without fail the charging current at the finishing time of the test. Also, the battery temperature was low under the over-charged state of the battery.

On the other hand, some of the nonaqueous electrolyte secondary batteries for Comparative Examples 1 and 2, which did not comprise the current stopping mechanism, ignited, though the number of ignited batteries was small.

Also, the batteries that did not ignite had a high battery temperature under the over-charged state of the battery. Further, all the batteries ignited when it comes to the batteries for Comparative Example 3, which did not comprise the safety mechanism.

Examples 4 to 7

Nonaqueous electrolyte secondary batteries were manufactured as in Example 1, except that the material and the thermal shrinkage properties of the thermally shrinkable resin tape were changed as shown in Table 2. In these Examples, adhesive sections were formed in both edge portions of the thermally shrinkable resin tape in a manner to extend in a direction perpendicular to the winding direction, i.e., a direction parallel to the winding axis. Each adhesive section had a width of 5 mm and, thus, the adhesive sections formed on the thermally shrinkable resin tape had a width of 10 mm in total. Table 2 shows the ratio in area of the adhesive sections to the entire thermally shrinkable resin tape.

Example 8

A nonaqueous electrolyte secondary battery was manufactured as in Example 1, except that an adhesive section having a width of 20 mm was formed on the entire region of the thermally shrinkable resin tape.

Example 9

A nonaqueous electrolyte secondary battery was manufactured as in Example 1, except that adhesive sections each having a width of 1.5 mm and extending in a direction perpendicular to the winding direction were formed in both edge portions of the thermally shrinkable resin tape. Since the adhesive sections had a width of 3 mm in total, the non-adhesive section of the thermally shrinkable resin tape had a width of 17 mm.

Comparative Example 4

A nonaqueous electrolyte secondary battery was manufactured as in Comparative Example 1, except that the region A was not formed.

The nonaqueous electrolyte secondary battery manufactured in each of Examples 4 to 9 and Comparative Example 4 was subjected to the over-charging test as described previously so as to measure the number of ignited batteries, the highest temperature reached, the temperature at the finishing time of the test, and the charging current at the finishing time of the test. Table 2 shows the results. Experimental data for Example 1 and Comparative Example 1 are also shown in Table 2.

TABLE 2

(Wound type electrode group)

| | Region A | Material of thermally shrinkable tape | Fixed area (%) | Deformation temperature | The number of ignited batteries | Highest temperature reached (° C.) | Temperature at finishing time of test (° C.) | Charging current at finishing time of test (A) |
|---|---|---|---|---|---|---|---|---|
| Example 1 | Formed | Porous polyethylene | 50 | 110° C. 10% shrinkage | 0 | 115 | 35 | 0 |
| Example 4 | Formed | Porous polyethylene | 50 | 90° C. 10% shrinkage | 0 | 110 | 35 | 0 |
| Example 5 | Formed | Porous polypropylene | 50 | 140° C. 15% shrinkage | 2 | 150 | 35 | 0 |
| Example 6 | Formed | Porous polypropylene | 50 | 130° C. 15% shrinkage | 0 | 138 | 35 | 0 |
| Example 7 | Formed | Polyethylene terephthalate | 50 | 130° C. 8% shrinkage | 0 | 140 | 35 | 0 |
| Example 8 | Formed | Porous polyethylene | 100 | 110° C. 10% shrinkage | 1 | 115 | 35 | 0 |
| Example 9 | Formed | Porous polyethylene | 15 | 110° C. 10% shrinkage | 1 | 120 | 35 | 0 |
| Comparative Example 1 | Formed | — | — | — | 1 | 135 | 65 | 0.2 |
| Comparative Example 4 | None | — | — | — | 10 | — | — | — |

As apparent from Table 2, the secondary battery for each of Examples 1 and 4 to 9 was capable of stopping the charging current at the finishing time of the test. Also, the temperature at the finishing time of the test was low, i.e., 35° C.

On the other hand, the secondary battery for Comparative Example 1 was incapable of stopping the over-charging current, and the temperature at the finishing time of the test was high, i.e., 65° C. Also, in Comparative Example 4, all the secondary batteries were ignited because the current stopping section was not included in the secondary battery.

It is significant to compare the secondary batteries for Examples 1 and 4 to 7 in respect of the thermal shrinkage temperature. As shown in Table 2, the secondary batteries for Examples 1, 4, 6 and 7, in which the thermal shrinkage temperature was 90° C. to 130° C., did not ignite during the over-charging test. Particularly, the secondary batteries for Examples 1 and 4, in which the thermal shrinkage temperature was 90° C. to 110° C., were found to be capable of lowering the highest temperature reached during the over-charging test.

Also, it is significant to compare the secondary batteries for Examples 1, 8 and 9 in respect of the area of the adhesive section formed on the thermally shrinkable resin tape. As apparent from Table 2, none of the ten samples of the secondary battery for Example 1, in which the area of the adhesive section fell within the range of 20 to 80%, ignited during the over-charging test.

Example 10

A nonaqueous electrolyte secondary battery was manufactured as in Example 2, except that the thickness of the spring member was set at 0.1 mm.

Example 11 to 12

A nonaqueous electrolyte secondary battery was manufactured as in Example 2, except that the transformation temperature of the shape memory alloy was changed as shown in Table 3.

An over-charging test was applied as described previously to each of the secondary batteries manufactured in Examples 10 to 12 so as to measure the number of ignited batteries, the highest temperature reached, the temperature at the finishing time of the test, and the charging current at the finishing time of the test. Table 3 shows the results. Incidentally, the experimental data for Examples 2, 3 and Comparative Examples 2, 3 described previously are also shown in Table 3.

the secondary battery for Example 2, in which the spring member had a thickness of 0.2 mm to 0.5 mm, was superior to the secondary battery for Example 10 in any of the ignition during the over-charging time, the highest temperature reached, the temperature at the finishing time of the test, and the charging current at the finishing time of the test.

Also, a shape memory alloy was used in each of the secondary batteries for Examples 3, 11 and 12. It can be understood by the comparison among the secondary batteries for these Examples that the secondary battery for each of Examples 3 and 11, in which the transformation temperature of the shape memory alloy fell within a range of 80 to 100° C., was superior to the secondary battery for Example 12 in any of the ignition during the over-charging time, the highest temperature reached, the temperature at the finishing time of the test, and the charging current at the finishing time of the test.

As described above in detail, one embodiment of the present invention provides a nonaqueous electrolyte secondary battery comprising a current stopping mechanism for enhancing the safety and exhibiting high rate characteristics.

Additional advantages and modifications will readily occur to those skilled in the art. Therefore, the invention in its

TABLE 3

(Laminate type electrode group)

|  | Region A | Means which imparts tensile stress or shearing stress | Material | Thickness (mm) | Transformation temperature (° C.) | The number of ignited batteries | Highest temperature reached (° C.) | Temperature at finishing time of test (° C.) | Charging current at finishing time of test (A) |
|---|---|---|---|---|---|---|---|---|---|
| Example 2 | Formed | Spring | Stainless steel | 0.3 | — | 0 | 98 | 35 | 0 |
| Example 10 | Formed | Spring | Stainless steel | 0.1 | — | 1 | 120 | 55 | 0.1 |
| Example 3 | Formed | Shape memory alloy | Ti—Ni based alloy | 0.3 | 100 | 0 | 110 | 35 | 0 |
| Example 11 | Formed | Shape memory alloy | Ti—Ni based alloy | 0.3 | 80 | 0 | 105 | 35 | 0 |
| Example 12 | Formed | Shape memory alloy | Ti—Ni based alloy | 0.3 | 140 | 2 | 155 | 70 | 0.4 |
| Comparative Example 2 | Formed | — | — | — | — | 2 | 140 | 90 | 0.6 |
| Comparative Example 3 | None | — | — | — | — | 10 | — | — | — |

As apparent from Table 3, the secondary battery for each of Examples 2, 3 and 10 to 12 was capable of decreasing the charging current at the finishing time of the test. It was also possible to lower the temperature at the finishing time of the test.

On the other hand, the charging current at the finishing time of the test for Comparative Example 2 was larger than that for each of Examples 2, 3 and 10 to 12, and the battery temperature at the finishing time of the test for Comparative Example 2 was higher than that for each of Examples 2, 3 and 10 to 12. The secondary battery for Comparative Example 3 did not include a current stopping section and, thus, all the secondary batteries ignited.

The secondary batteries for Examples 2 and 10 comprised spring members. It can be understood by the comparison between the secondary batteries for Examples 2 and 10 that broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising:
   a positive electrode including a positive electrode active material layer absorbing-releasing Li element or Li ions;
   a negative electrode including a negative electrode current collector formed of aluminum or an aluminum alloy and a negative electrode active material layer formed on a first region of the negative electrode current collector, and the negative electrode active material layer containing a negative electrode active material having a Li absorption-release potential nobler by at least 0.4V than a lithium electrode potential;

a negative electrode terminal electrically connected to a part of a second region of the negative electrode current collector, the negative electrode active material layer is not formed in the second region;

a separator provided between the positive electrode and the negative electrode;

a current stopping section formed in another part of the second region of the negative electrode current collector, the current stopping section being positioned between the negative electrode terminal and the negative electrode active material layer and facing the positive electrode active material layer via the separator; and a current stopping mechanism which imparts a tensile stress or a shearing stress to the current stopping section.

2. The nonaqueous electrolyte secondary battery according to claim 1, wherein an operating temperature of the current stopping mechanism is not lower than 60° C. and not higher than 140° C.

3. The nonaqueous electrolyte secondary battery according to claim 1, wherein the current stopping mechanism includes a thermally shrinkable resin tape.

4. The nonaqueous electrolyte secondary battery according to claim 3, wherein the thermally shrinkable resin tape is made of at least one kind of resin selected from the group consisting of polyethylene, polypropylene, polyvinyl chloride, polyethylene terephthalate, ethylene-propylene rubber, isoprene rubber, chloroprene rubber, styrene-butadiene rubber and nitrile-butadiene rubber.

5. The nonaqueous electrolyte secondary battery according to claim 1, wherein the current stopping mechanism includes a spring.

6. The nonaqueous electrolyte secondary battery according to claim 5, wherein the thickness of the spring is not smaller than 0.2 mm and not larger than 0.5 mm.

7. The nonaqueous electrolyte secondary battery according to claim 1, wherein the current stopping mechanism includes a shape memory alloy that has a spring shape.

8. A nonaqueous electrolyte secondary battery comprising an electrode group prepared by spirally winding a laminate structure including a positive electrode, a negative electrode and a separator; a negative electrode terminal; a current stopping section; and a current stopping mechanism, wherein:

the positive electrode includes a positive electrode active material layer absorbing-releasing Li element or Li ions;

the negative electrode includes a negative electrode current collector and a negative electrode active material layer, the negative electrode current collector being formed of aluminum or an aluminum alloy and having a first region and a second region, the negative electrode active material layer being formed on the first region of the negative electrode current collector, and the negative electrode active material layer containing a negative electrode active material having a Li absorption-release potential nobler by at least 0.4V than a lithium electrode potential;

the negative electrode terminal is electrically connected to an outer edge section of the second region of the negative electrode current collector;

the current stopping section is formed in the second region of the negative electrode current collector and positioned between the negative electrode terminal and the negative electrode active material layer, and the current stopping section facing the positive electrode active material layer via the separator; and the current stopping mechanism comprises a thermally shrinkable resin tape fixed to the current stopping section.

9. The nonaqueous electrolyte secondary battery according to claim 8, wherein a fixed area of the thermally shrinkable resin tape is not smaller than 20% and not larger than 80% of the area of the thermally shrinkable resin tape.

10. A nonaqueous electrolyte secondary battery comprising a case; an electrode group provided in the case and formed of a laminate structure including a positive electrode, a negative electrode and a separator; a negative electrode terminal; a current stopping section; and a current stopping mechanism, wherein:

the positive electrode includes a positive electrode active material layer absorbing-releasing Li element or Li ions;

the negative electrode includes a negative electrode current collector and a negative electrode active material layer, the negative electrode current collector being formed of aluminum or an aluminum alloy and having a projecting portion, the negative electrode active material layer being formed on the negative electrode current collector excluding at least the projecting portion and containing a negative electrode active material having a Li absorption-release potential nobler by at least 0.4V than a lithium electrode potential, and the projecting portion has a first section that faces the positive electrode active material layer via the separator, and a second section;

the negative electrode terminal is electrically connected to the second section of the projecting portion of the negative electrode current collector;

the current stopping section is formed in the first section of the projecting portion of the negative electrode current collector, the current stopping section lying in a current path between the negative electrode terminal and the negative electrode current collector; and the current stopping mechanism has a shape memory alloy member which is provided between an inner surface of the case and the projecting portion and which applies pressure to the projecting portion when a temperature in the case rises.

11. The nonaqueous electrolyte secondary battery according to claim 10, wherein the shape memory alloy member has a spring shape.

* * * * *